2,786,863

CATALYTIC STEAM-CARBON MONOXIDE SYNTHESIS OXYGEN-CONTAINING COMPOUNDS

Herbert Kölbel and Friedrich Engelhardt, Homberg, Niederrhein, Germany, assignors to Rheinpreussen Aktiengesellschaft fuer Bergbau und Chemie, Homberg, Niederrhein, Germany, a German corporation No Drawing. Application July 25, 1952,
Serial No. 300,963

Claims priority, application Germany August 1, 1951

3 Claims. (Cl. 260—449.6)

This invention relates to the catalytic steam-carbon monoxide synthesis of hydrocarbons and oxygen-containing compounds.

The production of hydrocarbons and oxygen-containing compounds by the hydrogenation of carbon monoxide with hydrogen in the presence of catalysts is well known in the prior art. The various catalysts which may be used for this purpose, their preparation and the various ranges of the synthesis condition are all well described. The addition of carbon monoxide hydrogenation reaction products, such as olefins, alcohols, aldehydes, ketones, acids, etc. to the carbon monoxide hydrogen-containing synthesis gas is also known. These reactive products are then built up during the synthesis into higher molecular products. The increase or reduction of the number of carbon atoms of hydrocarbons by the addition thereof to the hydrogenation is also known. Various other synthesis and modification of syntheses have also been described as, for example, the synthesis of methane, the synthesis of isohydrocarbons, the synthesis of oxygen-containing products such as synthol-synthesis, synol-synthesis, butyl-oil synthesis, methanol synthesis, and the synthesis of acids and aldehydes. The reaction conditions and the various catalysts which may be used for these syntheses are all well known in the art. In all these syntheses the hydrogenation of the carbon monoxide is effected with hydrogen, and the ratio of the carbon monoxide to the hydrogen in the initial gas may vary within wide limits, as is well known, depending upon the operating conditions, the nature of the catalyst and the desired products.

In all these methods, it is necessary to effect an activation of the carbon monoxide and the hydrogen with active catalysts in such a manner that methane is not exclusively produced. Thus if the catalysts effect an exceptionally strong activation of the hydrogen, methane will be produced. On the other hand, if the catalysts effect an excessively strong activation of the carbon monoxide, a rather large separation of carbon will occur.

One object of this invention is to effect the catalytic hydrogenation of carbon monoxide with the use of steam in place of hydrogen. This, and still further objects will become apparent from the following description.

In accordance with the present invention, it has now, in an entirely unexpected and extremely surprising manner, been found that the hydrogen required for the hydrogenation of the carbon monoxide in accordance with the known methods can be replaced by steam.

This is extremely surprising, since it could not in any way be foreseen that steam would constitute a reducing agent with respect to carbon monoxide in connection with the catalysts used in the above-mentioned processes. It is known and clearly set forth in the literature of the art that steam has an extremely injurious influence on catalysts in connection with carbon monoxide hydrogenation due to the fact that the structure of the catalysts will be altered thereby, as, for example, oxidized.

The invention constitutes a very substantial advance and enrichment in the art, inasmuch as it is no longer necessary to produce carbon monoxide-hydrogen mixtures in a cumbersome manner or prepare the hydrogen by reacting the carbon monoxide with steam, and that now it is sufficient to react carbon monoxide or gases containing carbon monoxide with inexpensive and readily obtainable steam. The economic advantage which is obtained by this advancement of the technique is obvious, inasmuch as it is known that carbon monoxide or gases containing carbon monoxide, such as, for instance, generator gas and blast furnace gas, are substantially simpler and cheaper to produce than mixtures of carbon monoxide and hydrogen. It was furthermore found that by means of the method set forth herein, the reduction of the carbon monoxide takes place in many cases more readily than when using hydrogen, which particularly facilitates the preparation of gases poor in carbon monoxide.

The method is applicable in principle to all syntheses of hydrocarbons or oxygen-containing compounds in connection with which the starting products constituted carbon monoxide and hydrogen, or from gases containing these two substances. In order to achieve the effect of the invention, it is necessary, when using catalysts in metallic condition, as, for example, the free metal, the metal carbide, the metal nitride, etc., that the steam partial pressure of the carbon monoxide-steam mixture does not exceed one-half of the total gas pressure. Of course, the method of the present invention can also be applied in such a manner that only a part of the hydrogen for the hydrogenation of the carbon monoxide is replaced by steam.

The replacement of the hydrogen by steam in accordance with the present invention also extends to all methods in which carbon monoxide-hydrogen mixtures are caused to react in combination with other components, such as, for example, the oxo-synthesis, as well as the known synthesis reactions between carbon monoxide-hydrogen mixtures and oxygen-containing or hydrogen-containing compounds for the formation of acids, oxy-acids, esters, ethers, etc. Even in methods in which, by the addition of hydrocarbons during the hydrogenation of the carbon monoxide with hydrogen, the hydrocarbons are converted into higher molecular hydrocarbons or degraded to lower molecular hydrocarbons, the hydrogen can be replaced by steam in accordance with the present invention. All the other reaction conditions of the synthesis are the same as was conventionally effected with the use of hydrogen. Since these conditions are all so well known and described in the art, they are not set forth herein. In the same manner, the catalysts which may be used, the manners of use, and the methods for the preparation thereof are identical with the conventionally known prior hydrogenation with the use of hydrogen and therefore are not set forth herein.

Thus, in accordance with the invention, it is merely necessary to effect any catalytic carbon monoxide hydrogenation with the use of hydrogen in the conventional and well-known manner merely by replacing the hydrogen with the steam or by partially replacing the hydrogen with steam. The only condition which must be watched is that when using catalysts in the metallic conditions, the steam partial pressure of the carbon monoxide steam mixture should not exceed one-half of the total pressure.

The method in accordance of the invention of replacing or partially replacing the hydrogen with the steam is applicable to all the hydrogenation and synthesis processes previously catalytically effected with carbon monoxide and hydrogen. It extends to the known processes in which reactive materials such as, for example, olefins, alcohols, aldehydes, ketones, amines, etc. are added during the hydrogenation to the synthesis gas mixture.

The following examples are illustrative of the invention:

Example 1

The catalyst used is an Fe-Cu-kieselguhr catalyst made alkaline with potassium carbonate, and containing 10 parts of magnesium, 10 parts of copper, 60 parts of kieselguhr and 2 parts of $K_2CO_3$ for every 100 parts by weight of iron. For its preparation a common aqueous solution of $Fe(NO_3)_3$, $Mg(NO_3)_2$ and $Cu(NO_3)_2$ containing 5% by weight of iron, to which there has been added 60 parts of kieselguhr, is precipitated at the boiling point in aqueous solution with the stoichiometric quantity of sodium carbonate. The precipitation mixture is boiled shortly and filtered, and the precipitate is washed with 70 to 90 times the quantity of boiling water referred to the quantity of iron. Thereupon, the residue is formed into a paste with a small amount of water, mixed well with an aqueous solution of potassium carbonate (2 parts by weight $K_2CO_3$ to 100 parts by weight of iron) and dried at 110° C.

Before being used, the catalyst must be converted to the active state. For this purpose, a $CO-H_2$ mixture containing one part by volume of CO to two parts by volume of $H_2$ is passed over the catalyst for 24 hours at a temperature of 270° C. with a volumetric velocity of 100, i. e. 100 m.$^3$ (N.T.P.) $CO-H_2$ mixture per hour per cubic meter of catalyst space.

Over the catalyst which has been thus pretreated, there is passed at ordinary pressure and a temperature of 235° C. a carbon monoxide steam mixture which contains one volume of steam per volume of CO at a volumetric speed of 20, i. e., 20 m.$^3$ CO-steam mixture per hour per m.$^3$ of catalyst space. In this connection there are produced 145 kg. hydrocarbons per m.$^3$ N.T.P. carbon monoxide, i. e. 94% of the theoretical amount.

The methane content is 8%. The carbon monoxide used for the reaction contains 98.5% CO and 1.5% $N_2$. The residual gas has the following average composition: 77.7% $CO_2$, 1.4% unsaturated hydrocarbons, 3% CO, 14.8% $H_2$, 2.5% saturated hydrocarbons and 0.6% $N_2$.

By catalyst space there is to be understood the part of the reaction space filled up by the catalyst.

Example 2

The Fe-Cu catalyst used is free of carrier substances and contains 0.1 part copper and 0.25 part potassium carbonate per 100 parts by weight of iron. For its preparation, a common aqueous solution of $Fe(NO_3)_3$ and $Cu(NO_3)_2$ containing 5% by weight of iron is precipitated at the boiling point with the stoichiometric quantity of sodium carbonate in aqueous solution. The precipitation mixture is boiled for a short time (a few minutes) and filtered, and the precipitate is washed with 70 to 90 times the quantity of boiling water (referred to the quantity of iron). Thereupon, the residue is formed into a paste with a small amount of water, mixed well with an aqueous solution of potassium carbonate (0.25 part by weight $K_2CO_3$ per 100 parts by weight Fe) and dried at 110° C.

In order to convert the catalyst into the active state, carbon monoxide is conducted over it with a volumetric speed of 100 for 24 hours at a temperature of 270° C., and thereupon hydrogen is conducted over it at the same temperature and with the same volumetric speed also for 24 hours.

Over the thus pretreated catalyst there is passed at a pressure of 10 atmospheres gauge and a temperature of 230° C. a carbon monoxide-steam mixture which contains one part by volume of steam per three parts by volume of CO. The carbon monoxide conversion between the 100th and 150th hour is 97.6%, a yield of 201 grams hydrocarbons and oxygen-containing compounds containing small amounts of methane per cubic meter N.T.P. of carbon monoxide being obtained.

Example 3

Over an alkalyzed Fe-Cu catalyst of the same composition, preparation and activation as in Example 2, there is passed at a pressure of 10 atmospheres gauge and a temperature of 230° C. a carbon monoxide-steam mixture which contains 1.25 parts by volume of steam to every 3 parts by volume of CO. With a yield of 162 grams hydrocarbons and oxygen-containing compounds containing small amounts of methane per cubic meter N.T.P. of carbon monoxide, there is obtained a 98.5% conversion.

Example 4

An Fe catalyst not containing any carrier and of the composition $Fe:Cu:K_2CO_3=100:0.5:0.25$ was reduced for 5 hours with electrolytic hydrogen at 520° C. and a volumetric speed of 1000. After this pretreatment, the catalyst had a metal content of 95%.

Over the catalyst which had been reduced in this manner, there was now passed at a pressure of 10 atmospheres gauge and a temperature of 270° C. a CO/steam mixture in a ratio of 3:1.25. With a carbon monoxide conversion of 92%, 165 grams of hydrocarbons per cubic meter under normal conditions of carbon monoxide used was obtained.

Example 5

A cobalt catalyst of the composition $CO:ThO_2:MgO:$ kieselguhr$=100:5:10:100$ was reduced for two hours at 450° C. and a volumetric velocity of 1000 with electrolytic hydrogen. Over the catalyst which had been thus pretreated, there was conducted at 100 atmospheres gauge and 190° C. a CO/steam mixture in the ratio of 3:1.28. With a carbon monoxide conversion of 100%, there were obtained 191 grams hydrocarbons per cubic meter (normal conditions) carbon monoxide used.

Example 6

A nickel catalyst of the composition $Ni:Mn:Al_2O_3:$ kieselguhr$=100:20:10:100$ was reduced for 5 hours at 350° C. and a volumetric velocity of 1000. Over the thus pretreated catalyst there was passed at 10 atmospheres gauge and 200° C. a CO/steam mixture in the ratio of 3:1.28. With a carbon monoxide conversion of 95% there were obtained 172 grams of hydrocarbons per cubic meter (N.T.P.) carbon monoxide used.

Example 7

Over an alkalyzed Fe-Cu catalyst there was first of all passed for three hours at 400° C. electrolytic hydrogen at a volumetric velocity of 1000. Thereupon, the catalyst was treated with ammonia for three hours at 300° C. and a volumetric velocity of 1000. In this manner there was obtained a catalyst consisting to the extent of 50% of nitride of the statistical equation $Fe_{1.8}N$. If this catalyst is treated at 10 atmospheres gauge with a CO/steam mixture in the ratio of 3:1.25, it shows over a period of 300 hours at 230° C. a constant CO conversion of 95% and after this period of time a carbon content of 6.5%.

Example 8

Over a cobalt-thorium catalyst which contains 15 parts of thorium and 200 parts of kieselguhr per every 100 parts of cobalt, there is passed at a temperature of 180° C. and a pressure of 100 atmospheres gauge a reaction mixture consisting of ethylene carbon monoxide and steam in the ratio of 2:2:1. With a gas volumetric velocity of 100 liters initial gas mixture per hour per liter of contact, there were obtained per cubic meter (N.T.P.) of ethylene plus carbon monoxide used, 450 grams of liquid reaction products of the following composition:

40% propionaldehyde
20% diethylketone
40% higher boiling aldehydes and ketones

Example 9

By decomposition and reduction of the nitrates of cobalt, thorium and copper on pieces of pumice having an average cross-section of 1 to 3 mm., there was produced a cobalt catalyst which contains 3 parts of copper and 18 parts of $ThO_2$/100 parts of cobalt. If a reaction mixture of ethylene-carbon monoxide and steam in the ratio of 1:3:2 is passed over this catalyst at a temperature of 200° C. and a pressure of 100 atmospheres gauge, there are obtained, with a gas volumetric velocity of 100 liters reaction gas/hour per liter of contact from every cubic meter (N.T.P.) ethylene and carbon monoxide used, 450 grams liquid reaction products, 75% of which consist of n-propyl alcohol.

Example 10

A thorium catalyst is precipitated from the nitrate solution with soda and a precipitate is washed free of alkali and dried at 110° C. By then treating it in an air current of 300° C. there is obtained a hard, granular catalyst having a bulk weight of 2.0.

If over this catalyst which has been pretreated in this manner there is conducted at a temperature of 450° C. and a pressure of 300 atmospheres gauge a carbon monoxide steam mixture in the ratio of 2:1, there are obtained at a gas volumetric velocity of 150 liters initial gas mixture per hour per liter of contact from each cubic meter (N.T.P.) carbon monoxide used, 112 grams liquid and gaseous hydrocarbons. 20% thereof consist of iso-$C_4$ hydrocarbons.

Example 11

A Ru-catalyst is prepared in the following manner: Metallic ruthenium is converted into potassium ruthenate by melting with caustic alkali and potassium nitrate. After dissolving in water, by the addition of methyl alcohol the ruthenium dioxide is precipitated at the boiling point, filtered off, thoroughly washed with water to which a small amount of nitric acid has been added, and then washed with hot water and dried at 105° C. This catalyst at a temperature of 200° C. and a pressure of 95 atmospheres gauge, and with a gas volumetric velocity of 100, converts a carbon monoxide-steam mixture in the ratio of 3:1 in such a manner that about 150 grams of hydrocarbons are obtained from every cubic meter (N.T.P.) carbon monoxide used. 100 grams of these hydrocarbons, therefore 70%, consist of white paraffin of a melting point of 118° C.

Example 12

For the preparation of higher alcohols from CO and steam there is used an Fe molten catalyst which is prepared in the following manner:

Iron oxides in the form of pyrites cinders are melted together with 2.5% alkali, the melt is quenched, and comminuted to a grain size of 1–3 mm. Thereupon the catalyst thus obtained is reduced for 48 hours with electrolytic hydrogen at 500° C. and a gas volumetric velocity of 2000 parts by volume of hydrogen per hour per part and volume of contact.

If a carbon monoxide-steam mixture of the ratio of 3:1.5 is passed at a gas velocity of 150 liters/hour, referred to one liter of contact, over this reduced catalyst under a pressure of 25 atmospheres gauge and at a temperature of 200° C., there are obtained about 170 grams total products from every cubic meter (N.T.P.) carbon monoxide, these products consisting of the following:

5.0 grams lower alcohols, B. P. <100° C.
97.0 grams higher alcohols, B. P. 100°–400° C.
15.0 grams gas oil-hydrocarbons
49.5 grams higher boiling hydrocarbons
3.5 grams $O_2$ containing products (esters and aldehydes)

Example 13

A CO-catalyst conventionally employed in oxo-synthesis consisting of cobalt, $ThO_2$, copper and kieselguhr in a ratio of 100:18:3:100 is first reduced at 400° C. with electrolytic hydrogen at a volumetric velocity of 500 for four hours. Thereupon, 1 mol of methanol vapor is added to this carbon monoxide steam mixture containing 1 mol of steam per 3 mols of carbon dioxide, and this gas-steam mixture is conducted at a pressure of 100 atmospheres gauge and a temperature of 210° C. over the cobalt catalyst. During the reaction which takes place, about 30% of the methanol is used up. With a CO conversion of 90% the methanol consumed appears in the synthesis products essentially as ethyl alcohol together with small quantities of methyl and ethyl acetate.

We claim:

1. In the method for the preparation of oxygen-containing compounds by the contacting of carbon monoxide and hydrogen-containing synthesis gas with a carbon monoxide hydrogenation catalyst, the improvement which comprises effecting said contacting with a carbon monoxide-containing synthesis gas containing steam in place of hydrogen and in the presence of methanol.

2. Improvement according to claim 1, in which the catalysts are in the metallic state and in which the steam in said synthesis gas has a partial pressure not exceeding one-half the total gas pressure.

3. Improvement according to claim 1, in which said synthesis gas is a carbon monoxide-containing synthesis gas containing steam in place of a portion of the hydrogen.

References Cited in the file of this patent

UNITED STATES PATENTS

| | | |
|---|---|---|
| 1,841,910 | Pier et al. | Jan. 19, 1932 |
| 2,257,293 | Dreyfus | Sept. 30, 1941 |
| 2,448,368 | Gresham et al. | Aug. 31, 1948 |
| 2,448,375 | Larson | Aug. 31, 1948 |
| 2,497,964 | Sumerford | Feb. 21, 1950 |
| 2,579,663 | Gilbert et al. | Dec. 25, 1951 |
| 2,594,964 | Du Bois Eastman et al. | Apr. 29, 1952 |

FOREIGN PATENTS

| | | |
|---|---|---|
| 186,899 | Great Britain | June 21, 1923 |
| 254,760 | Great Britain | July 2, 1926 |

OTHER REFERENCES

"Oxo Process," I. G. Farben, pub. by Chas A. Meyer and Company, 25 Vanderbilt Ave., New York, N. Y. (1948), pages 10–11, volume I.